Jan. 30, 1962 H. H. F. AHRENS 3,019,047
STORAGE AREA WITHIN MOTOR TRANSPORTS
Filed Aug. 7, 1959
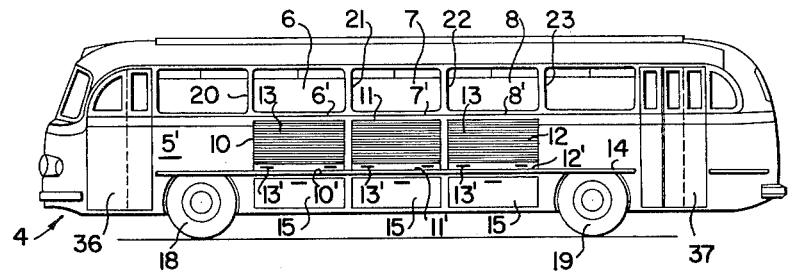
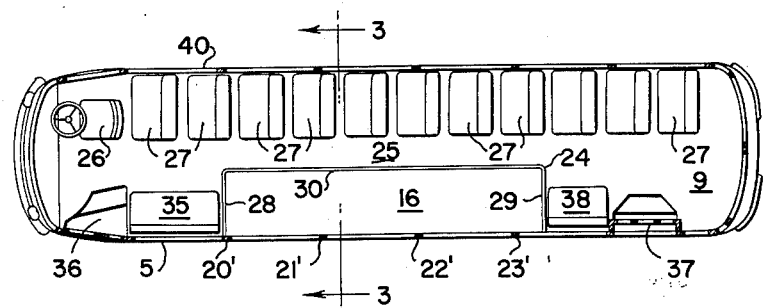
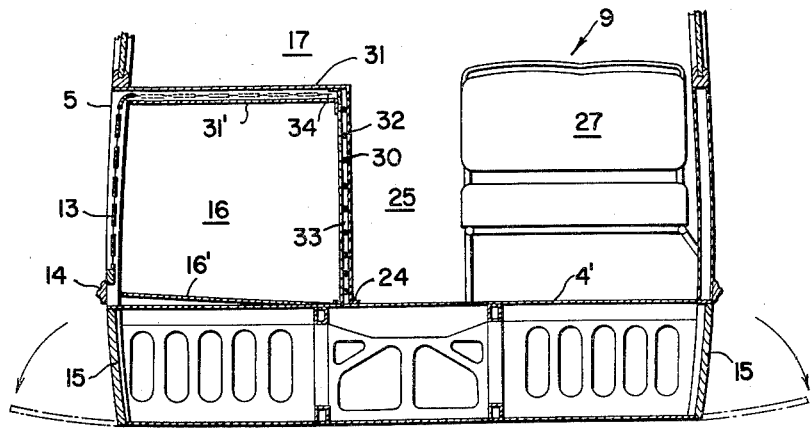
INVENTOR
HERMANN H. FR. AHRENS
BY Dicke, Craig and Freudenberg
ATTORNEYS ища
United States Patent Office 3,019,047
Patented Jan. 30, 1962

3,019,047
STORAGE AREA WITHIN MOTOR TRANSPORTS
Hermann H. F. Ahrens, Sindelfingen, Kreis Boeblingen, Germany, assignor to Daimler-Benz Aktiengesellschaft, Stuttgart-Unterturkheim, Germany
Filed Aug. 7, 1959, Ser. No. 832,394
Claims priority, application Germany Aug. 7, 1958
19 Claims. (Cl. 296—28)

The present invention relates to a motor vehicle, especially a large-area vehicle intended as shuttle- or feeder-type vehicle between the passenger ticketing place and the actual landing place or stopping area at airports, seaports or railroad stations, and serves the purpose of freeing the stopping or starting place of a transportation medium without considerable delays in time for the next utilization thereof by permitting relatively rapid boarding and leaving of the vehicle on the part of the passengers and by enabling a relatively rapid handling or turnover of the luggage belonging to the passengers.

In the shuttle- or feeder-type vehicles used heretofore in the prior art, the taking along of large luggage pieces usually presented difficulties by reason of lack of adequate space; for that reason, a separate baggage truck even for relatively small hand baggage was required between the ticketing or dispatching place and stopping or landing place of the transportation medium. The separation of the luggage from the passenger to whom it belongs results oftentimes in misunderstandings and confusion upon return of the luggage to the individual passenger at the place of destination or arrival. Furthermore, luggage pieces which might possibly be needed by the passenger during the travel are not available at all times to the passenger. Additionally, valuable luggage pieces cannot be supervised or guarded personally by the passenger during the travel or drive in these prior art feeder or shuttle type motor vehicles.

The aforementioned shortcomings and inadequacies of the prior art vehicles are eliminated by the construction of a novel type vehicle in accordance with the present invention intended especially as feeder-type or shuttle-type vehicle for service, for example, between the ticketing office at the airport terminal and the place on the airport such as the ramp or runway where the airplane may be boarded actually which oftentimes is located quite a distance from the terminal building.

The present invention essentially consists in arranging on one side of the feeder-type vehicle an approximately rectangularly or quadrangularly-shaped storage space for the luggage pieces of the passengers which extends inwardly of the vehicle to the center aisle thereof and essentially between the front and rear wheel casing on that side as well as between the window railing and the floor of the passenger space. The outer wall of the approximately rectangularly-shaped storage space is formed by movable wall parts adapted to be closed and/or locked, for example, by roller-type blinds whereas the remainder of the walls of the storage space including the upper terminal wall thereof are provided within the vehicle interior space with apertures to enable observation of the contents of the storage space by the passengers seated in the remainder of the vehicle.

Transversely and/or longitudinally extending struts or bars are thereby inserted as handrails into the wall frames of the forward and rearward transverse walls as well as also of the inner longitudinal lateral wall of the storage space whereby these wall frames are constructed in a mesh, screen, grating or grid-like manner. Furthermore, the storage space ceiling may be provided in a similar manner with a grating-type construction consisting of longitudinal rods or bars which is subdivided transversely at approximately the width of the windows of the vehicle and the individual sections of which may be pivotal in order to enable removal by the passengers of the individual luggage pieces from within the vehicle interior space during the drive. The storage space walls disposed within the vehicle interior space may also be constructed of relatively sturdy wire mesh or of several interrupted or apertured unitary sheet metal parts.

The movable outer cover walls for the storage space which preferably consist of roller-type blinds and which are also advantageously subdivided at approximately window width are adapted to be pulled upwardly during opening of the respective aperture in the vehicle lateral wall either into the hollow space located in the ceiling of the storage space and formed by means of a second ceiling wall thereof or into a box-type element arranged at the ceiling of the storage space, and may be pulled up or lifted locally mechanically, for example, manually or by means of a lifting mechanism of any suitable construction and/or remotely, for example, by means of a lifting mechanism electrically actuated from the instrument panel of the driver.

Accordingly, it is an object of the present invention to provide a feeder-type vehicle which obviates the disadvantages of the prior art vehicles.

Another object of the present invention is the provision of a motor vehicle which enables the simultaneous transportation of passengers and luggage while at the same time enabling on the one hand, relatively rapid boarding and leaving of the vehicle on the part of the passengers, and, on the other, very rapid and efficient handling of the passengers' luggage carried in the same vehicle.

Still a further object of the present invention resides in the provision of a feeder-type motor vehicle adapted to transport passengers and their luggage, including large-size pieces, from the ticketing or baggage checking point to the place where the transportation medium is actually boarded, for example, from the terminal building of an airport to the place where the airplane is parked on the runway or ramp, which makes possible the simultaneous transportation of the passengers and their luggage pieces in one and the same vehicle, while at the same time making possible the personal visual observation by the passengers of their luggage taken along in the same vehicle without imposing limitations on the size of the luggage pieces and without entailing delays in the handling of the luggage and therewith in the subsequent utilization of the vehicle.

These and other objects, features and advantages of the present invention will become more obvious from the following description when taken in connection with the accompanying drawing, which shows, for purposes of illustration only, one embodiment in accordance with the present invention and wherein—

FIGURE 1 is a side view of a feeder-type large-space motor vehicle adapted to be used, for example, as a feeder-type or shuttle-type vehicle in an airport installation.

FIGURE 2 is a top plan view of the feeder-type motor vehicle of FIGURE 1 with the roof thereof removed for purposes of clarity, and FIGURE 3 is a cross-sectional view taken along line 3—3 of FIGURE 2.

Referring now to the drawing wherein like reference numerals are used throughout the various views to designate like parts, reference numeral 4 generally designates the large-area or large-space motor vehicle (FIGURE 1) which serves as feeder or shuttle vehicle between dispatch or ticketing place and the place of boarding the transportation medium, for example, between the terminal building of an airport and the landing place of the vehicle to be boarded. The large-area vehicle 4 is provided on the left side thereof, as viewed in the driving direction with the entry or inlet 36 and with the exit 37. Additionally, the large-area motor vehicle 4 includes on the left side thereof, as viewed in the driving direction, a lateral body wall 5′ which is provided below the three centrally disposed windows 6, 7 and 8 of the passenger space generally designated by reference numeral 9 directly adjacent to the respective window railings 6′, 7′ and 8′ with an approximately rectangularly shaped aperture 10, 11 and 12 each. The apertures 10, 11 and 12 each of which is covered by means of a similarly shaped roller-type blind 13 made, for example, of metal extend downwardly to a guard rail 14 arranged at the height of the vehicle floor 4′ (FIGURE 3) on the outside of the vehicle side 5. Trap-compartments 15 covered by pivotal lids or the like for the work tools and other vehicle accessories are arranged below the floor 4′ (FIGURE 3) of the vehicle which extend approximately to the vehicle bottom side and also are approximately each of a width corresponding to the width of a respective one of the windows 6, 7 and 8. Close to the lower edge of each roller-type blind 13, one or several handle recesses 13′ are provided in addition to a suitable locking mechanism which may be of any suitable construction known in the prior art and which is not shown herein. Each roller-type blind 13 is adapted to be pulled up, depending on whether it is adapted to be unlocked locally or adapted to be unlocked from the driver's seat, either automatically by any suitable lifting mechanism such as a hydraulic, pneumatic or electric motor or manually by means of handles 13′.

The apertures 10, 11 and 12 form the inlet to the storage space 16 of the vehicle which storage space 16 is disposed within the interior space 17 (FIGURE 3) of the vehicle below the window railings 6′, 7′ and 8′ of the centrally disposed windows 6, 7 and 8 between the forward wheel casing for the front wheel 18 and the rearward wheel casing for the rear wheel 19. The outer wall of the storage space 16 is formed in part by the roller-type blinds 13, in part by the supporting posts 20′ to 23′ extended downwardly from the respective window posts or columns 20 to 23 and in part by a portion of the lateral wall 5′ whereas the bottom or floor 16′ (FIGURE 3) of the storage space 16 contiguous to the floor 4′ of the passenger space is slightly inclined upwardly in the outward direction up to the height of the lower edges 10′, 11′ and 12′ of each aperture 10, 11 and 12 respectively which are disposed slightly above the vehicle passenger floor 4′. The relatively long storage space 16 extends in width up to the edge 24 of the center aisle 25 disposed nearest thereto while the rows of the passenger seats 27 (FIGURES 2 and 3) disposed behind the driver's seat 26 (FIGURE 2) are arranged on the other side of the center aisle 25 within the passenger space 9.

The forward wall 28 (FIGURE 2), the rear wall 29, the inner side wall 30 (FIGURES 2 and 3) and possibly also the ceiling 31 of the storage space 16 consist of several longitudinally extending rods or bars 32 constructed as hand rails and secured each within frames whereby the rods or bars 32 have essentially identical distances 33 (FIGURE 3) from each other and are reinforced approximately in the plane of the outer supporting posts 20′ to 22′ by means of transverse bars or rods (not shown in the drawing). A second ceiling wall 31′ (FIGURE 3) is arranged below the ceiling 31 of the storage space 16 at a slight distance therefrom which is of similar construction and which together with the ceiling 31 forms a shelf-type space 34 accommodating therein the lifted roller-type blinds 13. The double ceiling 31, 31′ may also be subdivided into a plurality of individual sections pivotally secured in a hinge-like manner at the window railings 6′, 7′ and 8′ and resting loosely on the storage space walls 28, 29 and 30 so that they may be lifted from within the vehicle interior space or from the vehicle center aisle 25 by the passengers within the vehicle when they seek to obtain possession while in the vehicle of one of their luggage pieces transported in the luggage space 16. The upper side of the ceiling 31 may be used for placing or checking thereon clothing, blankets, or for placing thereon any other travel accessories of the vehicle passengers.

A further passenger bench 35 provided with a backrest extending along the vehicle side wall 5′ is arranged in front of the storage space 16 which extends up to the front entrance 36 of the vehicle whereas an additional seat 38 or bench provided also with a backrest extending parallel to the vehicle side wall 5′ occupies the space between the rear terminal wall 29 of the storage space 16 and the exit 37 of the vehicle.

The walls 28, 29 and 30 provided with suitable apertures or interruptions 33 and the ceiling 31 of the storage space 16 also possibly provided with numerous interruptions enable each passenger to observe at all times the luggage belonging to him and stored in the space 16. Furthermore, the apertures 10, 11 and 12 which may be rapidly and readily opened facilitate a rapid loading and unloading of the luggage into and from the space 16 with the assurance of properly channeling the correct luggage piece to each passenger under the latter's supervision whereby, additionally, the luggage belonging to the passenger is accessible also during the drive or during waiting periods.

Instead of using roller-type blinds 13, the apertures 10, 11 and 12 may also be provided with pivotal lids or covers adapted to be pivoted about axes arranged approximately at the height of the window railings 6′, 7′ and 8′. Furthermore, in the place of a plurality of seat rows 27, a continuous seat bench or a seating arrangement subdivided into individual seats may be arranged on the vehicle side 40 opposite the side 5 provided with the exit and inlet of the vehicle and opposite the storage space 16 which together with the backrest thereof extends along the outer wall 40, possibly also in the rear portion of the vehicle up to the exit 37 whereby in the rear portion of the vehicle the seating arrangement is suitably shaped to follow the contour of the vehicle outer walls.

While I have shown and described one embodiment in accordance with the present invention, it is understood that the same is not limited thereto but is susceptible of many changes and modifications within the spirit and scope of the present invention, and I, therefore, do not wish to be limited to the details shown and described herein but intend to cover all such changes and modifications as are encompassed by the scope of the appended claims.

I claim:

1. A motor vehicle, especially a large-space motor vehicle intended to serve as a feeder-type vehicle provided with vehicle outer body walls, with a center aisle, with front and rear wheels and with windows having window railings, comprising means forming a storage space located to one side of said center aisle within the vehicle, at least a portion of said means projecting above said center aisle to a position adjacent said window railings and extending essentially within the region between respective front and rear wheels, said storage space being adapted to store therein the luggage pieces of the passengers, said means forming a storage space including a portion of the vehicle outer body wall disposed on the side of said storage space provided with aperture means to enable access to said storage space from the outside, and movable wall means adapted to be closed and covering said aperture means in the closed position thereof, and a plurality of wall portions defining said storage space within the vehicle interior space, at least some of said wall portions being provided with a plurality of spaced observation means enabling the passengers within the vehicle to observe the storage space.

2. A motor vehicle, especially a large-space motor vehicle intended to serve as a feeder-type vehicle provided with vehicle outer body walls, with a center aisle, with front and rear wheels partly encased by wheel casings and with windows having window railings, comprising means forming a storage space located to one side of said center aisle within the vehicle, at least part of said means projecting above said center aisle to a position adjacent said window railings and extending essentially between respective front and rear wheel casings, said storage space being of approximately rectangular shape and adapted to store therein the luggage pieces of the passengers, the vehicle outer body wall disposed on the side of said storage space being provided with a plurality of apertures to enable access to said storage space from the outside, and said storage space including movable wall means adapted to be closed and covering said apertures in the closed position thereof and a plurality of wall portions defining said storage space within the vehicle interior space, at least some of said wall portions being provided with a plurality of observation means enabling the passengers within the vehicle to observe the storage space.

3. A motor vehicle, especially a large-space motor vehicle provided with front and rear wheels and intended to serve as a feeder-type vehicle comprising vehicle outer body walls, window means including railings, a center aisle within the vehicle for the passage of passengers, seating means for the passengers disposed to one side of said center aisle, and storage means forming a storage space to the other side of the center aisle within the vehicle essentially above said center aisle and extending longitudinally between the respective front and rear wheels disposed on that vehicle side, said storage space being of approximately rectangular shape and adapted to store therein the luggage pieces of the passengers, the outer body wall of the vehicle disposed on the side of said storage space being provided with aperture means, and said storage space including movable wall means adapted to be opened and closed and covering said aperture means in the closed position thereof and wall portions defining said storage space within the vehicle interior space and being provided with observation means enabling the passengers within the vehicle to observe the storage space.

4. A motor vehicle, especially a large-space motor vehicle intended to serve as a feeder-type vehicle provided with vehicle outer body walls, with a center aisle, with an entry and an exit located on one side of said center aisle and leading to said entry and exit, with front and rear wheels partly encased by wheel body casings and with windows having window railings, comprising means forming a storage space located to one side of said center aisle within the vehicle essentially below said window railings and essentially above said center aisle and extending essentially between respective front and rear wheel casings, said storage space being of approximately rectangular shape and adapted to store therein the luggage pieces of the passengers, the vehicle outer body wall disposed on said one side being provided with a plurality of apertures to enable access to said storage space from the outside thereof, said storage space including movable wall means adapted to be closed and covering said apertures in the closed position thereof, and a plurality of wall portions defining said storage space within the vehicle interior space, at least some of said wall portions being provided with visual observation means enabling the passengers within the vehicle to observe the storage space.

5. A motor vehicle according to claim 4, wherein said apertures have about the same width as said windows.

6. A motor vehicle according to claim 4, wherein said wall portions include a ceiling, transverse walls and longitudinal side walls all provided with visual observation means.

7. A motor vehicle according to claim 6, wherein said visual observation means is in the form of apertures.

8. A motor vehicle, especially a large-space motor vehicle provided with front and rear wheels and intended to serve as a feeder-type vehicle comprising vehicle outer body walls, window means including railings, a center aisle within the vehicle for the passage of passengers, seating means for the passengers disposed to one side of said center aisle, and storage means forming a storage space to the other side of the center aisle within the vehicle essentially below said window railings and above the level of the center aisle and extending longitudinally between respective front and rear wheels located on the same vehicle side, said storage space being of approximately rectangular shape and adapted to store therein the luggage pieces of the passengers, the outer body wall of the vehicle disposed on the side of said storage space being provided with aperture means, and movable roller-type means adapted to be opened and closed and covering said aperture means in the closed position thereof, and wall portions defining said storage space within the vehicle interior space and being provided with visual observation means enabling the passengers within the vehicle to observe the storage space.

9. A motor vehicle according to claim 8, wherein said movable roller-type means are roller-type blinds.

10. A motor vehicle according to claim 9, wherein the vehicle is provided with a vehicle floor and wherein the lower rim portion of said aperture means is disposed approximately at the height of said floor.

11. A motor vehicle according to claim 8, wherein said storage space is provided with a double-wall ceiling for accommodating therein said roller-type means upon opening of said aperture means.

12. A motor vehicle according to claim 8, wherein said vehicle includes a passenger space floor and wherein said storage space includes a floor extending from the side thereof adjacent said vehicle floor slightly upwardly at an incline in the vehicle outward direction up to the height of the lower edge of said aperture means.

13. A motor vehicle according to claim 1, wherein said wall portions include frame means provided with a plurality of longitudinally extending rods inserted into said frame means serving as hand rails and spaced substantially parallel to each other.

14. A motor vehicle according to claim 13, further comprising separate transverse rods crossing said longitudinally extending rods and reinforcing the same.

15. A motor vehicle according to claim 14, wherein said wall portions include a storage space ceiling subdivided into individual sections by said transversely extending rods, and means for pivotally securing said sections so as to be pivotal individually.

16. A motor vehicle according to claim 2, wherein said wall portions include a storage space ceiling subdivided into a plurality of sections with the separating joints extending in the vehicle transverse direction, and means for individually and pivotally securing said individual sections within the vehicle interior space so as to enable accessibility to said storage space from within the vehicle.

17. A motor vehicle according to claim 3, wherein said observation means are formed by a grating-type structure of said wall portions.

18. A motor vehicle according to claim 3, wherein said observation means are formed by interruptions in said wall portions.

19. A motor vehicle according to claim 3, wherein said observation means are formed by wire-mesh wall constructions.

References Cited in the file of this patent

UNITED STATES PATENTS

| | | | |
|---|---|---|---|
| 325,596 | Esten | Sept. 1, | 1885 |
| 1,475,329 | Wales | Nov. 27, | 1923 |
| 2,093,859 | Austin | Sept. 21, | 1937 |

FOREIGN PATENTS

| | | | |
|---|---|---|---|
| 766,836 | France | Apr. 23, | 1934 |
| 461,131 | Germany | June 13, | 1928 |